Figure 1:
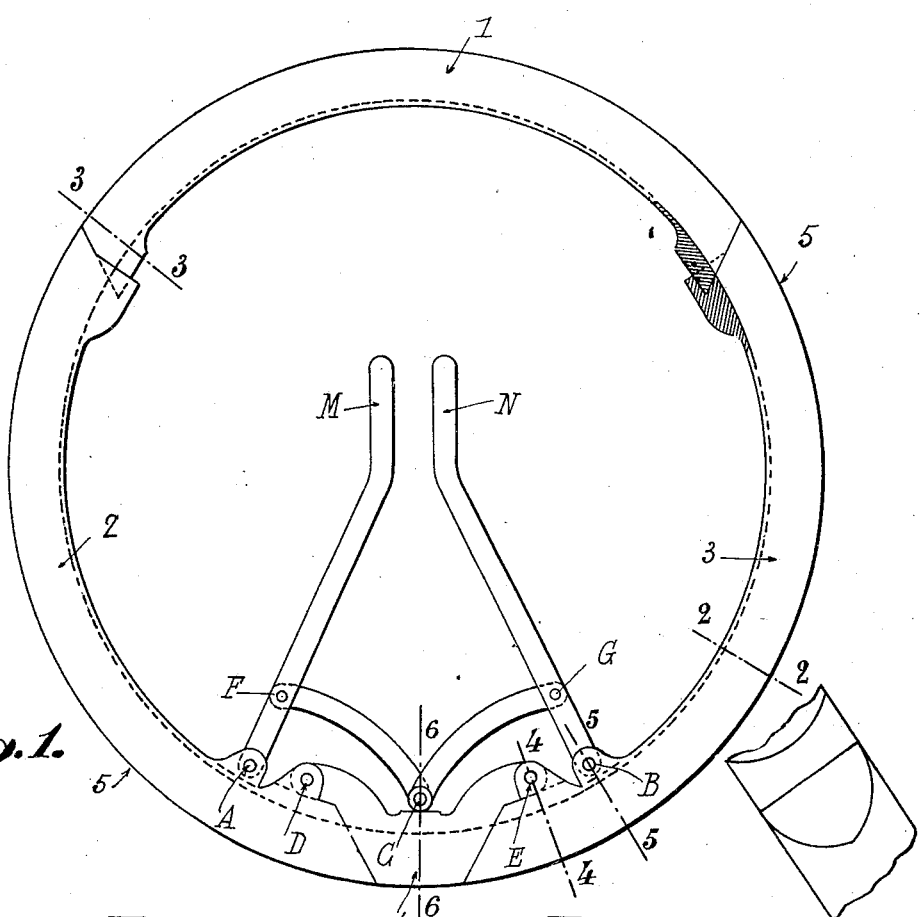

Jan. 13, 1931.　　　　　E. GARABIOL　　　　1,788,428
TORUS SHAPED DEVICE FOR MAINTAINING THE AIR BAGS OR WATER
BAGS DURING THE VULCANIZING OF PNEUMATIC TIRES
Filed Dec. 12, 1927

INVENTOR:
Emile Garabiol
BY: Reegs, Bayer & Bakelas
ATTORNEYS.

Patented Jan. 13, 1931

1,788,428

UNITED STATES PATENT OFFICE

EMILE GARABIOL, OF LA TRONCHE, NEAR GRENOBLE, FRANCE, ASSIGNOR TO SOCIETE DES PROCEDES "FIT," OF GRENOBLE, FRANCE

TORUS-SHAPED DEVICE FOR MAINTAINING THE AIR BAGS OR WATER BAGS DURING THE VULCANIZING OF PNEUMATIC TIRES

Application filed December 12, 1927, Serial No. 239,318, and in France June 14, 1927.

In the manufacture of pneumatic tires, and in the retreading industry, in order to produce the internal pressure required to vulcanize the tire casing in a mould, it is the customary practice to employ either air chambers or water chambers.

Such chambers are designated as air-bags or water-bags, and they are subjected to high pressures during the vulcanizing process.

However, a certain difficulty is met with when it is desired to place the said air or water chamber in the interior of the tire casing and to hold it securely in position therein, when it is subjected to the air or water pressure.

Various devices are in current use by which the air (or water) chamber will be held in its internal position. The known devices comprise pivotally mounted torus-shaped elements which consist of metal strips, of drawn steel pieces of the proper shape, or of cast metal, said elements being usually constructed so that they will have the exact diameter and internal shape of the air (or like) chamber which they support. It is an essential feature in the manufacture that the said torus-shaped elements should be properly inserted, but this is difficult to perform, and during the operation the air or water chamber is often pinched by the device, or bulged pockets are formed, or the chambers will burst, or like accidents will take place. The vulcanizing operation may also be attended with certain inconveniences.

The present invention has for its objects:

1.—An improved torus-shaped element which securely holds the air or water chamber during the vulcanizing of the pneumatic tires, whereby all of the usual defects will be obviated. The outer surface of the said torus-shaped element has a continuous concave shape corresponding to the form of the air or water chamber; said element essentially consists of a plurality of pieces fitting into each other and joined together by mere juxtaposition, and also of a wedge-shaped piece which completes the circular shape of the torus and stiffens it, and of a double-branched lever device which is pivotally mounted upon the pieces of the torus-shaped element adjacent the said wedge-shaped member, and which serves by means of its two struts which are pivoted together in the space between said branches, to place the wedge-shaped member in position and to press the torus-shaped elements together; I prefer to secure the said wedge-shaped member, in order to render the torus indeformable, by means of pins or the like which are inserted into holes in such manner that the said wedge-shaped member will be connected with the adjacent members.

2.—A process for the vulcanization of pneumatic tires by means of air-bags or water-bags, which comprises the placing and the use of the said torus for the maintenance of the said chamber in the tire casing during the operation.

The main features of my said invention will be specified in the following description with reference to the appended drawings which are given by way of example.

Fig. 1 is an elevational view, comprising a partial section, of the torus according to the invention, which is provided with a special key.

Figure 2:
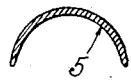
Figure 3:
Figure 4:
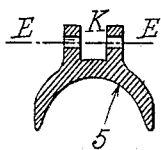
Figure 5:
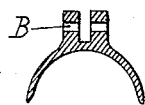
Figure 6:
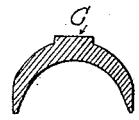

Fig. 2 is a section on the line 2—2 of Fig. 1.
Fig. 3 is a section on the line 3—3 of Fig. 1.
Fig. 4 is a section on the line 4—4 of Fig. 1.
Fig. 5 is a section on the line 5—5 of Fig. 1.
Fig. 6 is a section on the line 6—6 of Fig. 1.

In the construction herein represented, the torus-shaped member consists preferably of a light cast metal such as aluminium and is composed of four parts 1—2—3—4 of unequal length. The parts 1—2—3 are so constructed that they may be simply fitted together without the use of pivot joints or other attaching means. Their outer surface 5 has a semi-circular concave shaped action and is adapted to hold and to support the air chamber or the water chamber in a continuous and uniform manner upon its whole length. The several pieces may be juxtaposed by means of accurate flat end surfaces which exactly correspond in order that the chamber will never be pinched at these joints.

The last piece 4 comprises inclined sides and thus forms a wedge. On its internal face it comprises a flat part C by which it may be inserted between the pieces 2 and 3 and thus placed in position. Its outer face has a concave shape like the other pieces and is placed in exact alignment therewith. The said piece is preferably provided with side lugs engaging in the slots K formed in the forked brackets D and E of the pieces 2 and 3; the said torus-shaped device is made rigid by pins or pegs inserted into holes in the said brackets and into the lugs provided on the said wedge-shaped piece.

The pieces 2 and 3 of the said torus are further provided with two other forked brackets A and B, or like elements, by which the said lever device serving for the insertion of the said wedge-shaped member will be suitably pivoted. The said lever device essentially consists of the two branches M and N, pivoted at A and B, and of two curved struts CF—CG which are inwardly disposed with reference to the branches M and N; said struts are pivotally connected together at C at which point they support a roller or the like, and are also pivoted at their respective ends F—G to the branches M—N.

The vulcanizing method by the use of the said torus-shaped device will thus comprise a stage in which the said air or water chamber is put in place, and herein, after placing the said chamber in position, I assemble the pieces 1—2—3 preferably at the lower part of the tire in such manner that they will be held together by their own weight. I then place the wedge-shaped piece 4 in position and drive it into place by hand pressure upon the branches M—N. By means of its roller, the joint C will drive in the piece 4 until its outer surface is in exact coincidence with the adjacent pieces. I then insert at D and E suitable pins whereby the piece 4 is secured and the whole torus-shaped device is consolidated in a rigid and reliable manner. The apparatus will thus have the exact circular form, and will act at all points against the extension and deformation of the air bag or the water bag.

Obviously, my said invention is not limited to the details of construction herein specified, these being given solely by way of example. In particular, the lever device controlling the wedge may be varied as desired in shape and disposition; other fastening means may be employed; any suitable number of pieces may be assembled, and like dispositions may be employed, without departing from the spirit of the invention.

Having now described my invention what I claim as new and desire to secure by Letters Patent is:

1. A torus-shaped device for maintaining the air-bags or water-bags during the vulcanizing of pneumatic tires comprising a number of arcuated elements having a groove on their external face and fitting into each other by mere juxtaposition end to end, so as to form a nearly complete ring leaving between its ends a free space limited by inversely inclined faces, a wedge-shaped piece also provided with an external groove adapted to fill said free space so as to complete the ring and to assure its rigidity, and means adapted to hold said wedge-shaped piece in said free space.

2. A torus-shaped device for maintaining the air-bags or water-bags during the vulcanizing of pneumatic tires comprising a number of arcuated elements having a groove on their external face and fitting into each other by mere juxtaposition end to end, so as to form a nearly complete ring leaving between its ends a free space limited by inversely inclined faces, a wedge-shaped piece also provided with an external groove adapted to fill said free space and to fit into said ends of said ring and pins extending through said wedge-piece and through said ends of said ring in order to secure said wedge-piece in said free space.

3. A torus-shaped device for maintaining the air-bags or water-bags during the vulcanizing of pneumatic tires comprising a number of arcuated elements having a groove on their external face and fitting into each other by mere juxtaposition so as to form a nearly complete ring leaving between its ends a free space limited by inversely inclined faces, a wedge-shaped piece also provided with an external groove adapted to fill said free space so as to complete the ring and to assure its rigidity, and means adapted to urge said wedge-shaped piece into said free space.

4. A torus-shaped device for maintaining the air-bags or water-bags during the vulcanizing of pneumatic tires comprising a number of arcuated elements having a groove on their external face and fitting into each other by mere juxtaposition so as to form a nearly complete ring leaving between its ends a free space limited by inversely inclined faces, a wedge-shaped piece also provided with an external groove adapted to fill said free space so as to complete the ring and to assure its rigidity, two levers pivoted on said ring on opposite sides of the free space and two arms pivoted on said levers and having their ends hinged together and adapted to bear on the inner face of said wedge-shaped piece.

5. A torus-shaped device for maintaining the air-bags or water-bags during the vulcanizing of pneumatic tires comprising a number of arcuated elements having a groove on their external face and provided at their ends with corresponding projections and recesses, whereby they are adapted to be assembled end to end and to fit into each other so as to be prevented from sliding transversely and to form a nearly complete ring leaving between its ends a free space limited by inversely inclined faces, a wedge-shaped piece also provided with an external groove adapted to fill said free space so as to complete the ring and to assure its rigidity, and means adapted to hold said wedge-shaped piece in said free space.

6. A torus-shaped device for maintaining the air-bags or water-bags during the vulcanizing of pneumatic tires comprising a number of arcuated elements having a groove on their external face and jointed together end to end by means of a tongue and mortise joint so as to be prevented from sliding transversely and to form a nearly complete ring leaving between its ends a free space limited by inversely inclined faces, a wedge-shaped piece also provided with an external groove adapted to fill said free space so as to complete the ring and to assure its rigidity, means adapted to hold said wedge-shaped piece in said free space, means for urging said wedge-shaped piece into said free space and means for securing in place said wedge-shaped piece.

In testimony whereof I have signed my name to this specification.

EMILE GARABIOL.